US00RE39945E

(19) United States
(12) Reissued Patent
Brown

(10) Patent Number: US RE39,945 E
(45) Date of Reissued Patent: Dec. 25, 2007

(54) IRON COVER

(75) Inventor: Eli Brown, Walla Walla, WA (US)

(73) Assignee: Originality, LLC, Salt Lake City, UT (US)

(21) Appl. No.: 10/742,692

(22) Filed: Dec. 22, 2003

Related U.S. Patent Documents

Reissue of:
(64) Patent No.: 6,499,519
Issued: Dec. 31, 2002
Appl. No.: 09/713,056
Filed: Nov. 16, 2000

U.S. Applications:
(60) Provisional application No. 60/167,580, filed on Nov. 26, 1999.

(51) Int. Cl.
*B65D 65/02* (2006.01)

(52) U.S. Cl. ..... 150/161; 150/165; 206/349; 38/97

(58) Field of Classification Search ..... 150/161, 150/165; 206/349; 38/97
See application file for complete search history.

(56) References Cited

U.S. PATENT DOCUMENTS 2,743,542 A * 5/1956 Drummond
3,121,965 A * 2/1964 McBride ..... 38/97
4,570,792 A * 2/1986 Conway ..... 206/349
4,660,307 A * 4/1987 Fay ..... 38/94
5,638,955 A * 6/1997 Calciano ..... 206/320
5,664,349 A * 9/1997 White et al. ..... 38/97
5,987,788 A * 11/1999 Doyel ..... 38/97

* cited by examiner

*Primary Examiner*—David T. Fidei
(74) *Attorney, Agent, or Firm*—Marcus G. Theodore

(57) ABSTRACT

An iron cover for ski wax irons a heat resistant liner having a padded bottom segment shaped to cover and protect the sole of an iron and a plurality of side flaps with ends. The side flaps extend sufficiently around the sides of an iron placed within the liner, and are secured around the iron with an elastic cord associated with the side flaps. The side flaps are structured and separated to define a plurality of heat release vents to allow heat to escape from a hot iron placed in the cover for storage.

10 Claims, 5 Drawing Sheets

IRON COVER

Matter enclosed in heavy brackets [ ] appears in the original patent but forms no part of this reissue specification; matter printed in italics indicates the additions made by reissue.

RELATED APPLICATIONS

This application is a continuation-in-part application of the provisional application entitled "Iron Cover" filed Nov. 26, 1999, Ser. No. 60/167,580.

BACKGROUND OF THE INVENTION

1. Field

This invention relates to heating irons. In particular, it relates to heating iron covers for ski wax irons.

2. State of the Art

A number of iron covers are known. Iron covers are used for a variety of purposes such as preventing the scorching of materials being ironed. Doyel, U.S. Pat. No. 5,987,788 provides a removable iron cover with steam passage holes made of polytetrafluroethylene (PTFE) inserted over the sole plate of a steam iron to facilitate the efficient delivery of steam from the iron to the material being ironed. It also reduces friction, and acts as a thermal barrier to prevent burning of the material. Emberson-Nash et al, U.S. Pat. No. 5,815,962 provides another attachable cover for the sole-plate of a hand steam iron made of a relatively thin sheet of friction reducing PTFE material including steam passage holes which provides a low friction heat shield for hand pressing steam irons.

A number of curling iron cases have been designed for storing curling irons that are still warm. These irons cannot simply be stowed in a suitcase or kit where items may be damaged in close proximity to the heated iron. Thus the prior art contains a number of curling irons travel cases used to store a hot curling iron, such as Lykowski, U.S. Pat. No. 5,950,826 which also provides a single travel case with multiple storage compartments for the curling iron and other hair maintenance devices and materials.

Ski wax irons are used to apply various types of waxes to the bottoms of skis, snowboards, and toboggans. Different waxes are used to alter the performance characteristics of the skies to suit a particular snow conditions and protect the skis from moisture. Conventional methods of applying a wax coating to a surface use a solid bar of wax to rub the wax from the bar onto the surface. This hand rubbing typically left a non-uniform and discontinuous layer of wax on the surface, which then had to be smoothed with a piece of plastic or cork. Others used a hand-held propane torch to melt the wax to form a uniform coating on the surface. Still others applied wax to the skies by brushing or rolling melted wax onto the skies.

Ski irons were developed to not only melt the solid wax to drop onto the sliding surfaces, but to then evenly distribute the same using the sole of the hot iron in a trowel-like movement. Thus the bottom of the ski wax iron must be smooth to prevent uneven application of the wax or roughing the sliding surface; thereby reducing the ski's performance. Others use ski wax irons to melt and apply a wax laminate to the bottom of the ski, such as the wax laminate described in Fitzburgh, U.S. Pat. No. 5,534,061.

These ski wax irons typically only get up to about 200 degrees Celcius to prevent breaking down the components of various types of waxes and bases of skis. However, when turned off, they still are too hot to be placed into an equipment bag without damaging other items placed therein, such as supplies of waxes. Oftentimes, when used in the field the hot ski wax iron is placed in the snow to rapidly cool it before storage. This causes water to get into the electronics damaging the iron. The sole of these ski wax irons must also be protected during storage from marring or damage. The iron cover described below provides a protective cover for these ski wax irons to aid in ready storage while still warm.

OBJECTIVES OF THE INVENTION

The objective of the present invention is to provide a cover for the new ski wax irons used to apply waxes to the bottom of skies, although it can be used with other conventional irons.

A further objective is to provide an iron cover, which protects the bottom surface of the iron from nicks, scrapes, and marring. The bottoms of ski wax irons must be protected during storage to prevent them from accidentally being dented or marred in a manner to affect the smooth application of waxes to the bottoms of skis.

Still a further objective is to provide a cover, which partially insulates the hot iron from damaging articles placed in a bag with the cooling iron. These ski wax irons often are used quickly in the field and then have to be put in an equipment bag while still warn. Thus, there is a need for heat resistant, padded storage iron cover for ski wax irons to insure a better performance of skis. It also indirectly better protects the base of the skis.

SUMMARY OF THE INVENTION

The invention comprises an iron cover having a padded bottom covered by a flexible non-transmitting heat resistant liner shaped to fit over and cover the sole of a ski wax iron. The bottom padding is of sufficient thickness to prevent the sole of the iron from being damaged by accidental contact. Attached to the padded bottom are a plurality of side flaps also covered by a heat resistant liner. The side flaps are expandably secured together to extend sufficiently around the sides of the iron to secure the iron cover there around with draw strings or other securing means. This oversize side flap configuration allows various sized of irons to be placed and secured within the cover. Each side flap is separated and structured when folded about the iron to define side heat release vents therebetween to allow heat to escape from the cooling hot iron placed therein for storage.

The preferred embodiment uses a flannel type of material for the heat resistant finer, although other materials such as plastics, metal, and fabrics could be used which protect from abrasion, are heat resistant, and will not readily transmit heat from the cooling iron. The preferred material also will not rub off against the sole of the iron during storage. Examples of preferred materials are:

a. 16 oz. Neoprene coated fiberglass, which is particularly suited to protect from abrasion and liquids,
b. 18 oz white general purpose fiberglass, 20 oz yellow fiberglass coated for abrasion that has a 1000 degree F. melt temperature,
c. 22 oz Kevlar blend, which is abrasion and heat resistant and has a 900 degree F. melt temperature,
d. 28 oz black fiberglass, which is coated for abrasion resistance and has a 1200 degree F. melt temperature,
e. 30 oz yellow fiberglass, which is coated for abrasion resistance and has a 1000 degree F. melt temperature,
f. 32 oz orange fiberglass, which is coated for abrasion resistance and has a 1000 degree F. melt temperature, g. 18 oz bronze silica/ceramic, which is coated for abrasion resistance and has a 3000 degree F. melt temperature, h. 12 oz duck, which is fire, water, mildew resistant, i. 32 oz chrome tanned leather, j. para aramid fiber, which is abrasion, cut and temperature resistant and has high tensile strength used for protective clothing, k. ceramic fiber, which has very high temperature resistance, and low thermal conductivity, used in kiln car seals, l. meta aramid fiber, which is inherently flame retardant and has good temperature resistance used in protective fire proximity clothing, m. silica fiber, which has very high temperature resistance, low thermal conductivity, and low abrasion resistance, n. Permanent flame retardant (PFR) rayon, which has good strength and is used in fire proximity clothing.

The heat resistant liner is generally covered by another flexible material resistant to abrasion, such as nylon, to protect the liner from being cut or abraded. However, the iron cover could be made entirely of the heat resistant liner material, provided it had sufficient durability.

The preferred iron cover shape is square, with the liner made of a heat resistant material laid out in a cross-shape to form side flaps with cut out corners surrounding the bottom area, which covers the sole of the iron. A similar shaped nylon outer cover is then placed over the liner, and a layer of cotton, plastic, or other padding added therebetween to pad the bottom of the iron cover to prevent damage to the sole of the iron. The heat resistant liner is then stitched, welded, or secured to the outer cover to secure the padding in position and form open loops or holes in the ends of the side flaps. A rubberized nylon or plastic cord is then threaded between the loops or holes to raise the flaps to secure around an iron and form the heat release vents. The nylon cord preferably has a fastener associated with its ends to enable the cord shortened or lengthened for tightening around the sides of different sized irons. Various types of fasteners can be used for this purpose, or the ends of the elasticized cord may be secured or tied together without a fastener.

Other iron cover shapes may be employed as long as they are sufficient to cover the sole of the iron to protect it from dirt, scratches, dents or any other impact damage, which would mar the iron sole surface. However, the cover and flaps must be expandable to secure around the iron and form or have side heat release vent holes when secured about a cooling iron to release heat.

Also attached to the bottom of the iron cover is an openable strap storage system to secure about the iron placed within the iron cover. This strap storage system is also configured to secure folded iron power cords to the iron cover. The preferred embodiment of the storage system comprises an securable strap with corresponding hook and loop strips securing the ends and corresponding segments. This strap is sewn to the bottom of the cover in a manner to removably secure around an iron placed therein, but having additional length to fold back on itself in a manner to secure folded power cords therebetween. In the preferred embodiment, this is accomplished by lining segments of the strap with hoop and loop strips, so that the end of the strap can be threaded through a cinch attached to one end of the sewn strap, which is doubled back over the top of the iron cover to secure between the ends of the strap the folded power cord of the iron.

To use the invention, a hot iron is first allowed to cool somewhat so that it won't singe the liner. Then it is placed within the cover on the heat resistant liner segment covering the padded bottom and secured therein with the elastic cord holding the sides flaps. The iron is further secured by the strap system and the iron cord is then folded and secured thereto with the double backed ends of the strap affixed with the corresponding hook and loop strips. Thus stored, the iron cover protects the sole of the iron from scratches and marring. It also prevents direct transmission of the heat from the iron, and allows hot irons to gradually cool during storage. Ski wax irons may therefore be put away in an equipment bag or kit while still warm without damaging waxes and other stored equipment. The power strap storage system also secures the wrapped iron cord and keeps it neatly packed.

DESCRIPTION OF THE ILLUSTRATED EMBODIMENTS

Figure 1:
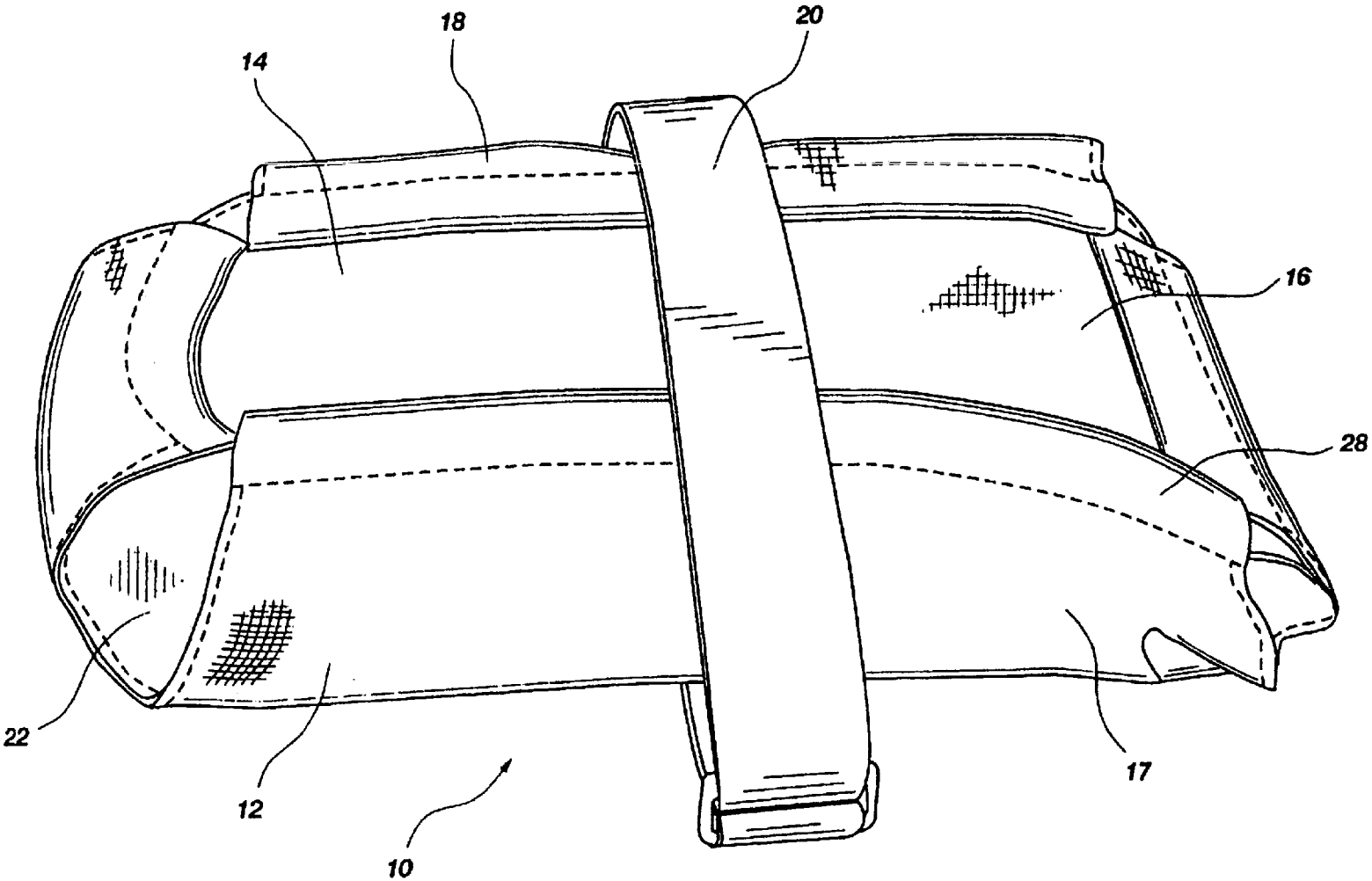
FIG. 1 is a perspective view of one preferred embodiment

As shown in FIG. 1, the invention 10 comprises an iron cover 12 having a square padded bottom 14 formed by a flexible heat resistant reflective liner 16 sewn to a nylon cover 17 shaped to fit over and cover the sole of a ski wax iron. The padded bottom 14 is of sufficient thickness to prevent the sole of the iron from being damaged by accidental contact. Attached to the padded bottom 14 are a plurality of side flaps 18 also covered by the heat resistant liner 16. The side flaps 18 are expandably secured together to extend sufficiently around the sides of the iron placed therein to secure the iron cover there around with draw strings or other securing means. This preferred embodiment uses a reflective nylon heat resistant type of material for the heat resistant liner 16, and a durable nylon for the cover 17.

Figure 2:
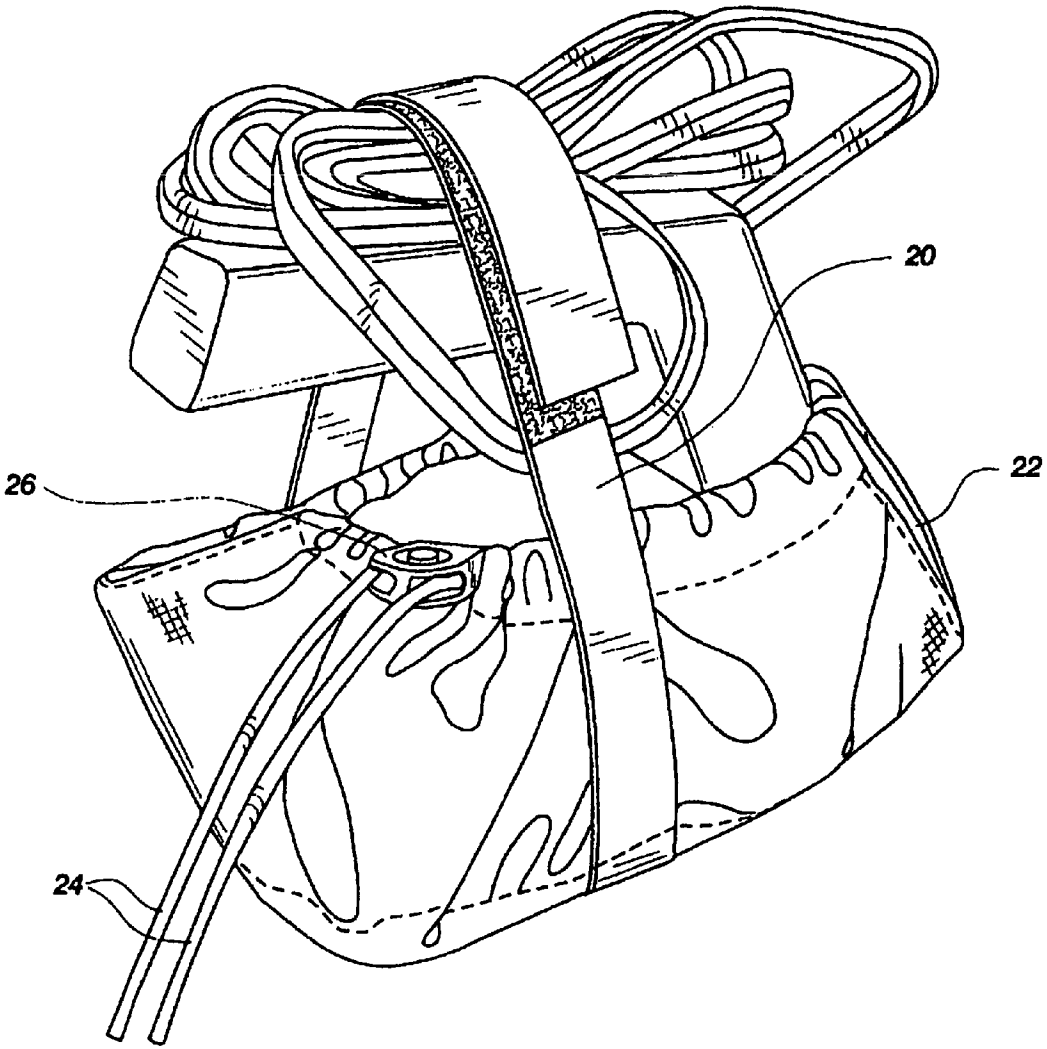
FIG. 2 is a side view of the embodiment shown in FIG. 1.

A strap webbing 20 storage system surrounds and is attached to the bottom 14 to secure the iron and power cord in place. Each side flap 18 is separated and structured when folded about the iron to define side heat release vents 22 therebetween to allow heat to escape from the cooling hot iron placed therein for storage. A drawstring 24 with a fastener 26 shown in FIG. 2 passes through loops 28 in the side flaps 18 to secure the side flaps 18 about the sides of the iron to allow the vents to release the heat.

Figure 3:
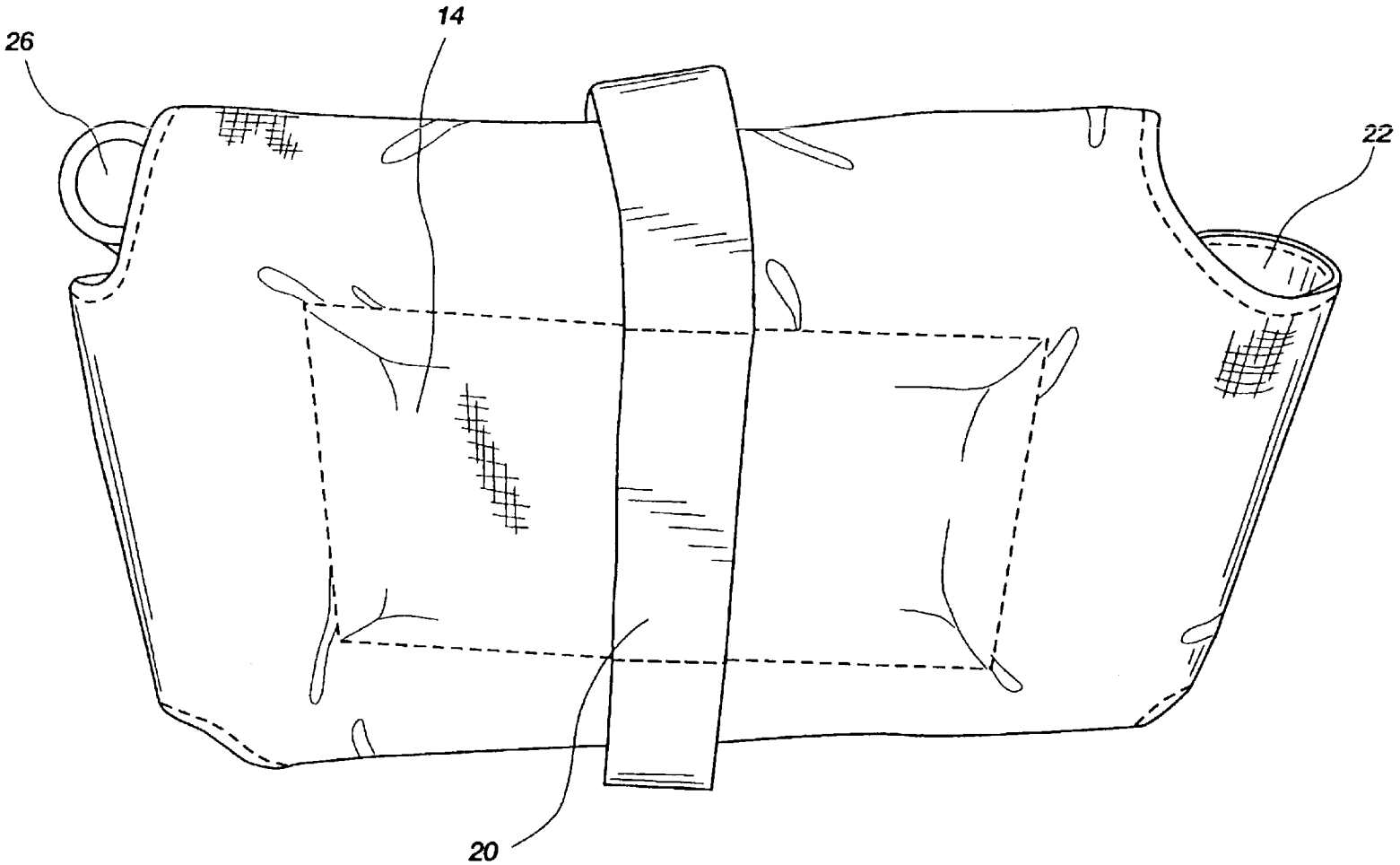
FIG. 3 is a bottom view of the embodiment shown in FIG. 1.

FIG. 3 shows the padded bottom 14 and sides flaps 18 covered with the nylon cover 17. The padded bottom 14 is contains a quarter inch thick cotton pad (not shown). The strap webbing 20 is sewn to the bottom 14 as shown to wrap around the iron cover.

Figure 4:
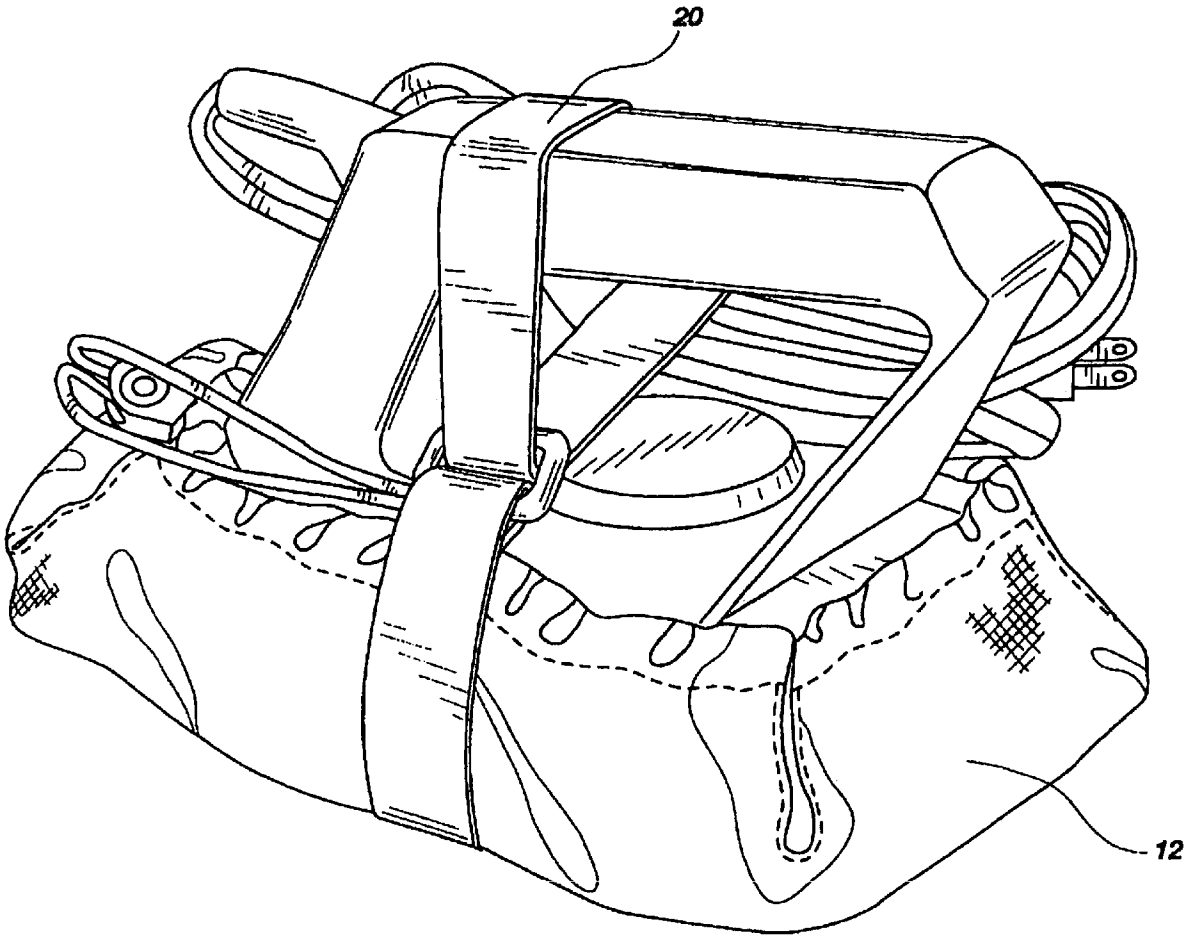
FIG. 4 is a perspective view of another preferred embodiment
Figure 5:
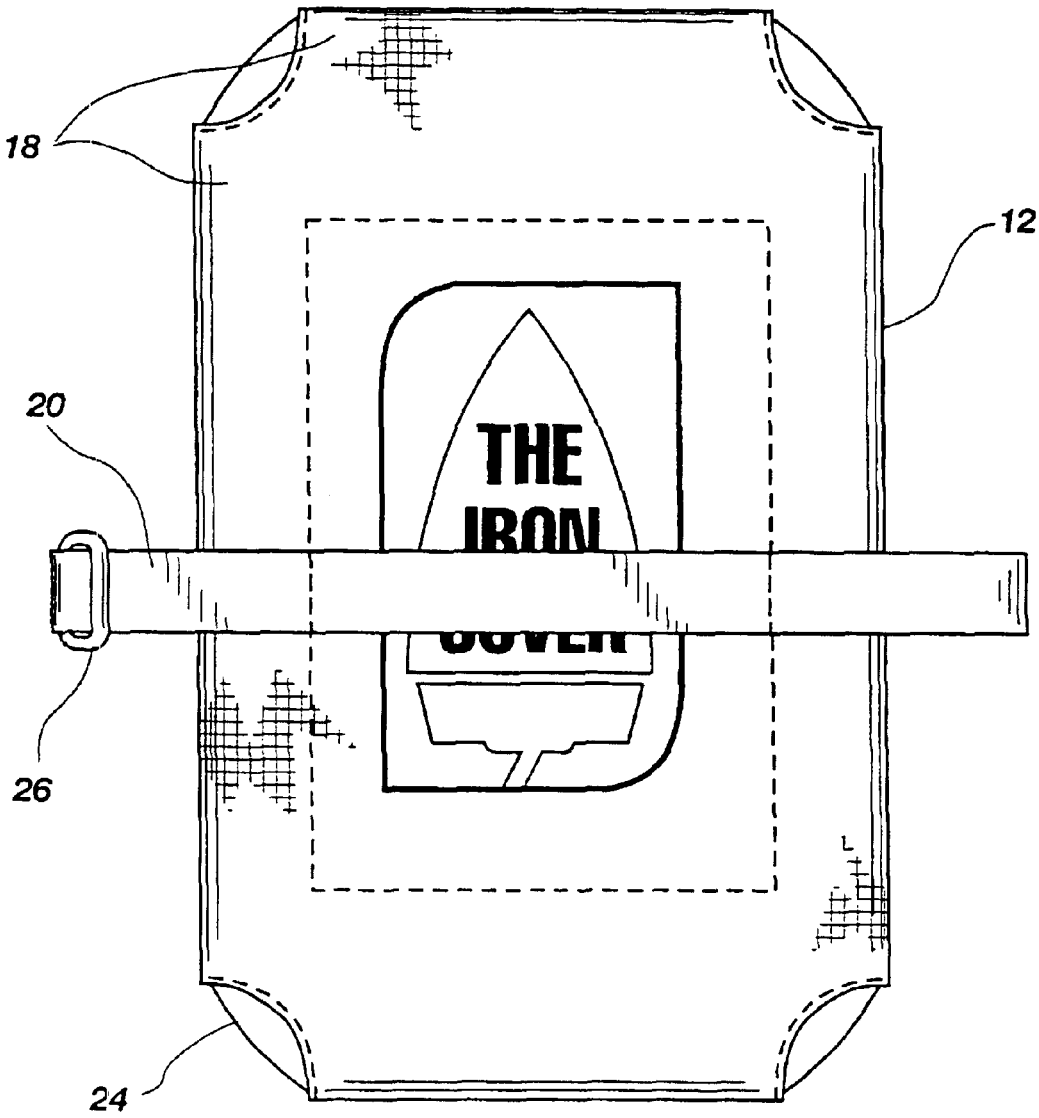
FIG. 5 is a bottom view of the embodiment of FIG. 4

FIG. 4 is a perspective view of another preferred embodiment of the invention 10. This embodiment employs an iron cover 12 made of a felt liner 16 covered by a nylon. It is shown secured about a Swix digital iron, which gets up to 352.4 degrees Fahrenheit. The folded power cord is secured on the side of the iron handle. These ski wax irons do not heat up to a temperature, which will break down the components of the ski waxes, and therefore lower temperature resistant liners 16, such as felt, can be used FIG. 5 is a bottom view of the iron cover 12 showing the strap cinch 30 associated with the end of the strap 20. The nylon draw cord 24 is shown interconnecting the side flaps 18.

Although this specification has referred to the illustrated embodiments, it is not intended to restrict the scope of the appending claims. The claims themselves recite those features deemed essential to the invention.

I claim:

1. An iron cover comprising:

a. a non-transmitting heat resistant liner having:

i. a padded bottom segment shaped to cover and protect a sole of an iron placed thereon from marring or damage, and ii. a plurality of side flaps with ends, the side flaps extending sufficiently to secure around the sides of an iron placed within the liner and structured to define a plurality of heat release vents to allow heat to escape from a hot iron placed in the cover for storage, and b. securing means associated with ends of the side flaps to secure them around the iron.

2. An iron cover according to claim 1, including an abrasion resistant cover attached to and covering the heat resistant liner.

3. An iron cover comprising:

a. a non-transmitting heat resistant liner having:

i. a padded bottom segment shaped to cover and protect a sole of an iron placed thereon from marring or damage, and ii. a plurality of side flaps with ends, the side flaps extending sufficiently to secure around the sides of an iron placed within the liner and structured to define a plurality of heat release vents to allow heat to escape from a hot iron placed in the cover for storage, b. securing means associated with ends of the side flaps to secure them around the iron, and c. an abrasion resistant cover attached to and covering the heat resistant liner.

4. An iron according to claim 3, wherein the liner has a cross shape having arms and the body, the flaps formed of the arms, and the padded body segment formed of the body.

5. An iron cover comprising:

a. a flexible non-transmitting heat resistant liner with:

1. a central body segment padded and sized to cover and protect a sole of an iron and 2. a plurality of side flaps extending sufficiently to be secured around the sides of an iron placed within the liner, b. securing means associated with ends of the side flaps to secure them around the iron, the side flaps structured and separated to define heat release vents to allow heat to escape from a hot iron placed in the cover for storage, c. a flexible abrasion resistant cover attached to and covering the heat resistant liner, and d. an openable strap storage system with attachment ends to secure the cover about the iron, and power cords therebetween when the ends are folded back upon themselves.

6. An iron cover according to claim 5, wherein the cover is shaped in the form of a cross having arms forming the side flaps and the body of the cross forming the central body segment.

7. An iron cover according to claim 5, wherein the securing means comprises an elastic cord associated with the side flaps.

*8. An iron cover comprising:*

*a. a non-transmitting heat resistant liner having:*

*i. a padded bottom segment shaped to cover and protect a sole of an iron placed thereon from marring or damage, and*

*ii. a plurality of side flaps with ends, the side flaps extending sufficiently to secure around the sides of an iron placed within the liner to allow heat to escape from a hot iron placed in the cover for storage, and*

*b. securing means associated with ends of the side flaps to secure them around the iron.*

*9. An iron cover according to claim 8, wherein the iron cover is shaped to accommodate a conventional angle iron having a pointed end and the securing means comprise an elastic cord.*

*10. An iron cover according to claim 9, wherein the side flaps are separated to define a plurality of side vents to allow heat to escape through the sides of the cover as well as through the top of the exposed portions of the iron.*

* * * * *